US010920389B2

(12) United States Patent
Dowdy et al.

(10) Patent No.: US 10,920,389 B2
(45) Date of Patent: Feb. 16, 2021

(54) MULTI-STAGE COMING OFF LOCATION TECHNOLOGY

(71) Applicant: Rowan Companies, Inc., Houston, TX (US)

(72) Inventors: Michael James Dowdy, Hockley, TX (US); Hong Yuan Hsu, Katy, TX (US); Agung Atus Sundia, Katy, TX (US); Jose H. Vazquez, West University Place, TX (US)

(73) Assignee: Rowan Companies, Inc., Houston, TX (US)

( * ) Notice: Subject to any disclaimer, the term of this patent is extended or adjusted under 35 U.S.C. 154(b) by 192 days.

(21) Appl. No.: 15/667,319

(22) Filed: Aug. 2, 2017

(65) Prior Publication Data

US 2019/0040598 A1 Feb. 7, 2019

(51) Int. Cl.
*E02B 17/08* (2006.01)
*B63J 99/00* (2009.01)
(Continued)

(52) U.S. Cl.
CPC .............. *E02B 17/08* (2013.01); *B63B 21/50* (2013.01); *B63J 99/00* (2013.01); *E02B 17/021* (2013.01);
(Continued)

(58) Field of Classification Search
CPC .......... B63J 2099/006; B63J 2099/008; E02B 17/04; E02B 17/08; B63B 35/44;
(Continued)

(56) References Cited

U.S. PATENT DOCUMENTS 9,580,150 B2 * 2/2017 Lee .................... B63B 9/001
2007/0203623 A1 * 8/2007 Saunders ............. G05D 1/0206
701/23

(Continued)

FOREIGN PATENT DOCUMENTS

| CN | 103093067 B | 1/2016 |
| CN | 104250968 B | 1/2016 |
| WO | 2017033149 A1 | 3/2017 |

OTHER PUBLICATIONS

International Search Report dated Nov. 28, 2018 in counterpart International Application No. PCT/US2018/044933.

*Primary Examiner* — Andrew Polay
(74) *Attorney, Agent, or Firm* — Fletcher Yoder, P.C.

(57) ABSTRACT

A first permissible operating range of the self-elevating vessel is determined based on a first structural analysis of the self-elevating vessel under a first set of conditions. A structural utilization ratio of the self-elevating vessel is determined based on a second structural analysis of the self-elevating vessel under first and second sets of conditions. Safety of lowering the self-elevating vessel from an elevated state to a first hull draft level is determined when the structural utilization ratio is less than a predetermined value. Safety of lowering the self-elevating vessel from the first hull draft level to a second hull draft level is indicated when positional displacement data obtained while the vessel is at the first hull draft level indicates that the positional displacement of the self-elevating vessel while at the first hull draft level is within the first permissible operating range.

25 Claims, 7 Drawing Sheets

(51) Int. Cl.
  *E02B 17/02* (2006.01)
  *B63B 21/50* (2006.01)
  *G05B 15/02* (2006.01)
  *E02B 17/00* (2006.01)
  *B63B 35/44* (2006.01)
  *B63B 79/00* (2020.01)

(52) U.S. Cl.
  CPC .............. *G05B 15/02* (2013.01); *B63B 35/44* (2013.01); *B63B 35/4413* (2013.01); *B63B 79/00* (2020.01); *B63B 2035/448* (2013.01); *B63B 2035/4473* (2013.01); *E02B 17/0818* (2013.01); *E02B 2017/006* (2013.01); *E02B 2017/0056* (2013.01); *E02B 2017/0082* (2013.01)

(58) Field of Classification Search
  CPC ... B63B 79/00; B63B 21/50; B63B 2021/505; B63B 79/10; B63B 79/15; B63B 79/20
  See application file for complete search history.

(56) References Cited

U.S. PATENT DOCUMENTS

2016/0055280 A1\* 2/2016 Devoy ................ G06F 17/5018
  703/2
2017/0369127 A1\* 12/2017 Cusano .................. B63B 49/00

\* cited by examiner

MULTI-STAGE COMING OFF LOCATION TECHNOLOGY

BACKGROUND

This disclosure relates generally to mobile offshore units. More particularly, but not by way of limitation, this disclosure relates to a system for extracting self-elevating vessels during a coming off location operation.

Self-elevating vessels are used in the offshore industry to perform drilling operations to access hydrocarbon reservoirs in the seabed, provide accommodation to offshore personnel, perform offshore wind farm installation, assist in performing related construction activities, etc. Self-elevating vessels can refer to, for example, jackups, liftboats, jackup barges, mobile offshore drilling units (MODUs), mobile offshore production units (MOPUs) and the like.

Generally, a self-elevating vessel comprises a hull and one or more legs extending downward from or through the hull. The hull is buoyant and adapted to float in water. The legs are designed to support the hull in an elevated state. The legs may extend through openings provided in the hull or may be attached to the sides of the hull. An elevating system may be rigidly attached to the hull to allow the legs to move vertically in relation to the hull to elevate (or lower) the hull. A self-elevating vessel has two primary states in which it operates: (i) an afloat state in which footings of all the legs are off the seabed and the entire vessel structure is supported by the buoyancy of the hull; and (ii) an elevated state in which the legs are lowered into the seabed to be firmly supported by the seabed and the hull is elevated above the waterline with a positive airgap between the hull and the waterline. When the vessel is moved in the afloat state to a desired offshore location and the state of the vessel is changed at the location from the afloat state to the elevated state, such an operation is commonly referred to as a "going on location" operation. Conversely, when the vessel is to be moved away from the offshore location and the state of the vessel is to be changed from the elevated state back to the afloat state, such an operation is commonly referred to as a "coming off location" operation.

SUMMARY

The following summary is included in order to provide a basic understanding of some aspects and features of the claimed subject matter. This summary is not an extensive overview and as such it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

According to one or more embodiments, a system includes a first interface to receive sensor output indicative of a positional displacement of a self-elevating vessel. The system further includes a memory and one or more processors communicatively coupled to the memory and the first interface. The one or more processors execute program instructions stored in the memory for causing the one or more processors to obtain first and second sets of conditions corresponding to the self-elevating vessel; determine a first permissible operating range of the self-elevating vessel based on a first structural analysis of the self-elevating vessel under the first set of conditions (for example, the first permissible operating range corresponds to a first hull draft level of the self-elevating vessel); determine a structural utilization ratio of the self-elevating vessel based on a second structural analysis of the self-elevating vessel under the first and second sets of conditions; determine it is safe to lower the self-elevating vessel from an elevated state having a positive airgap to the first hull draft level that eliminates the positive airgap when the structural utilization ratio is less than or equal to a predetermined value; obtain first positional displacement data from the first interface while the vessel is at the first hull draft level, and indicate it is safe to lower the self-elevating vessel from the first hull draft level to a second, deeper, hull draft level when the first positional displacement data indicates that the positional displacement of the self-elevating vessel while at the first hull draft level is within the first permissible operating range.

In another embodiment, a non-transitory computer readable recording medium stores a computer readable program that is executable by one or more processors to perform operations including receiving sensor output indicative of a positional displacement of a self-elevating vessel; obtaining first and second sets of conditions corresponding to the self-elevating vessel; determining a first permissible operating range of the self-elevating vessel based on a first structural analysis of the self-elevating vessel under the first set of conditions (for example, the first permissible operating range corresponds to a first hull draft level of the self-elevating vessel); determining a structural utilization ratio of the self-elevating vessel based on a second structural analysis of the self-elevating vessel under the first and second sets of conditions; determining it is safe to lower the self-elevating vessel from an elevated state having a positive airgap to the first hull draft level that eliminates the positive airgap when the structural utilization ratio is less than or equal to a predetermined value; obtaining first positional displacement data indicating the positional displacement while the vessel is at the first hull draft level; and indicating it is safe to lower the self-elevating vessel from the first hull draft level to a second, deeper, hull draft level when the first positional displacement data indicates that the positional displacement of the self-elevating vessel while at the first hull draft level is within the first permissible operating range.

In another embodiment, a self-elevating vessel includes a hull adapted to float, a plurality of legs extending substantially perpendicular to the hull, a positional displacement sensor that senses a positional displacement of a self-elevating vessel, a memory, and one or more processors communicatively coupled to the memory. The one or more processors execute program instructions stored in the memory for causing the one or more processors to obtain first and second sets of conditions corresponding to the self-elevating vessel; determine a first permissible operating range of the self-elevating vessel based on a first structural analysis of the self-elevating vessel under the first set of conditions (for example, the first permissible operating range corresponds to a first hull draft level of the self-elevating vessel); determine a structural utilization ratio of the self-elevating vessel based on a second structural analysis of the self-elevating vessel under the first and second sets of conditions; determine it is safe to lower the self-elevating vessel from an elevated state having a positive airgap to the first hull draft level that eliminates the positive airgap when the structural utilization ratio is less than or equal to a predetermined value; obtain first positional displacement data from the positional displacement sensor while the vessel is at the first hull draft level; and indicate it is safe to lower the self-elevating vessel from the first hull draft level to a second, deeper, hull draft level when the first positional displacement data indicates that the positional displacement of the self-elevating vessel while at the first hull draft level is within the first permissible operating range.

DETAILED DESCRIPTION

This disclosure pertains to an improved self-elevating vessel and systems and computer-readable media for improving operations thereof. Techniques disclosed herein look to aid personnel, and to automate, coming off location operations for self-elevating vessels. In particular, a structural analysis of the self-elevating vessel can be performed based on conditions of the self-elevating vessel (e.g., site conditions where the self-elevating vessel is stationed, vessel conditions, and/or environmental conditions). Permissible operating ranges (e.g., watch circles) defining maximum permissible limits of hull motion (displacement) in the water may be determined for multiple hull draft levels based on the vessel's physical limits identified by the structural analysis. A maximum utilization ratio for the self-elevating vessel under actual environmental conditions (e.g., as-measured wave heights with directionality, wave spread, period, and composition information of wave energy—both wind-driven and swells) measured using onboard instrumentation may be found and used to make an initial assessment as to whether it is safe to lower the vessel into the water (i.e., to begin coming off location or leg pulling operations). In finding the utilization ratio, as-measured environmental conditions may be used rather than relying on highly subjective human-observations or generic wave forecasts. Upon lowering the vessel into the water, additional onboard instrumentation may be used to track the response of the hull due to the environment and if the response is within the previously determined permissible operating ranges, leg pulling operations may be continued. As-measured hull motions at multiple hull drafts may be compared against corresponding watch circles to determine whether the as-measured conditions are within acceptable operating limits of the vessel for carrying out the coming off location operations in multiple stages. Thus, personnel can more accurately determine if the vessel's legs can safely be pulled from the seabed.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of display systems having the benefit of this disclosure.

Figure 1:
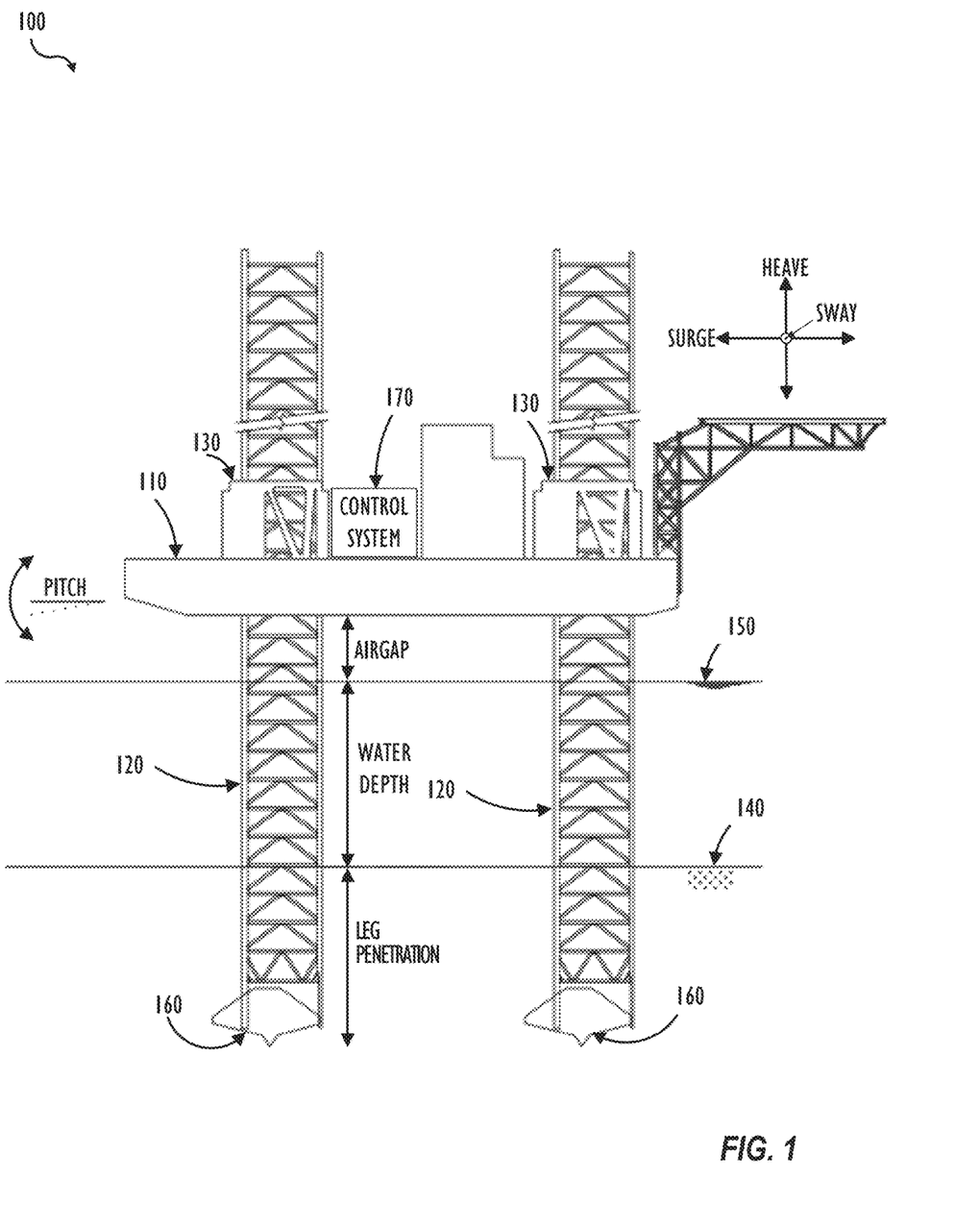
FIG. 1 shows, in profile view, a self-elevating vessel in an elevated state in accordance with one or more embodiments.

FIG. 1 shows a self-elevating vessel 100 in an elevated state according to one embodiment. Self-elevating vessel 100 may be a jackup rig (as shown in FIG. 1), liftboat, jackup barge, mobile offshore drilling unit (MODU), mobile offshore production unit (MOPU), mobile offshore windfarm installation unit and the like. As shown in FIG. 1, vessel 100 includes hull 110, one or more legs 120, elevating systems 130, and control system 170. Hull 110 is buoyant and adapted to support the weight of vessel 100 including legs 120 and any onboard cargo. When vessel 100 is in the elevated state, hull 110 is raised above waterline 150 with a positive airgap between hull 110 and waterline 150. In the elevated state, the weight of vessel 100 is supported by legs 120 that have been lowered into seabed 140. Legs 120 may be provided with footings (e.g., spudcans and the like) 160 that are adapted to penetrate into seabed 140. Once preloaded, legs 120 can support vessel 100 by transmitting loads between vessel 100 and seabed 140. Elevating systems 130 may be fixedly attached to hull 110 to raise and lower hull 110 relative to legs 120 so as to transition vessel 100 from an elevated state to an afloat state and vice versa. An exemplary implementation of elevating systems 130 may include a rack-and-pinion mechanism. When vessel 100 is in the elevated state, elevating systems 130 may be operated to lower hull 110 into the water until the buoyancy of hull 110 is sufficient to extract and raise legs 120. Further, elevating systems 130 may be operated to lock legs 120 into a position relative to hull 110 once vessel 100 has completed its transition to the elevated state (or to the afloat state).

Figure 2:
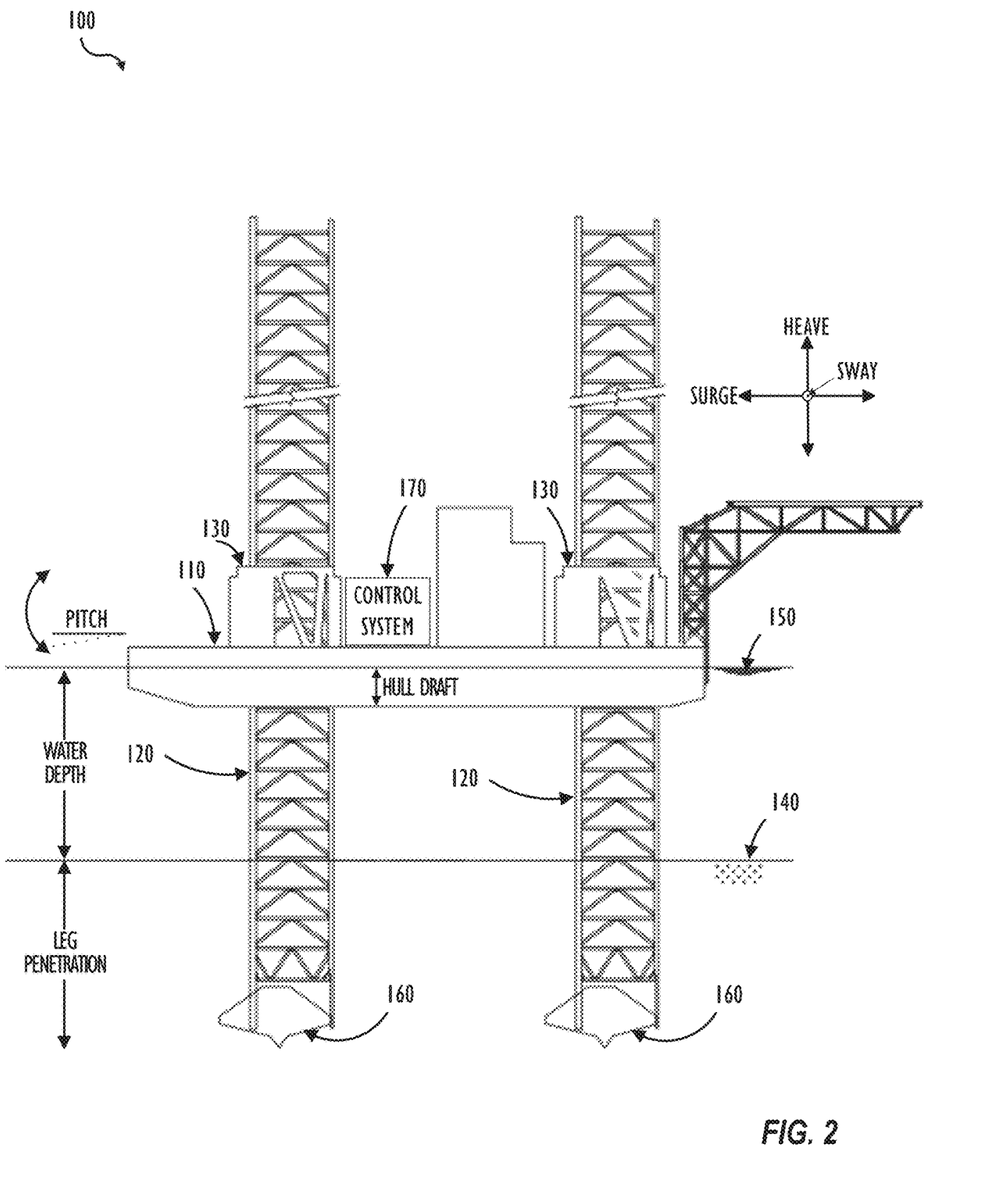
FIG. 2 shows, in profile view, a self-elevating vessel in a transition state after having commenced a coming off location operation in accordance with one or more embodiments.

The process of transitioning vessel 100 from the elevated state to the afloat state, commonly referred to as coming off location, is illustrated in a transition state shown in FIG. 2.

Figure 3:
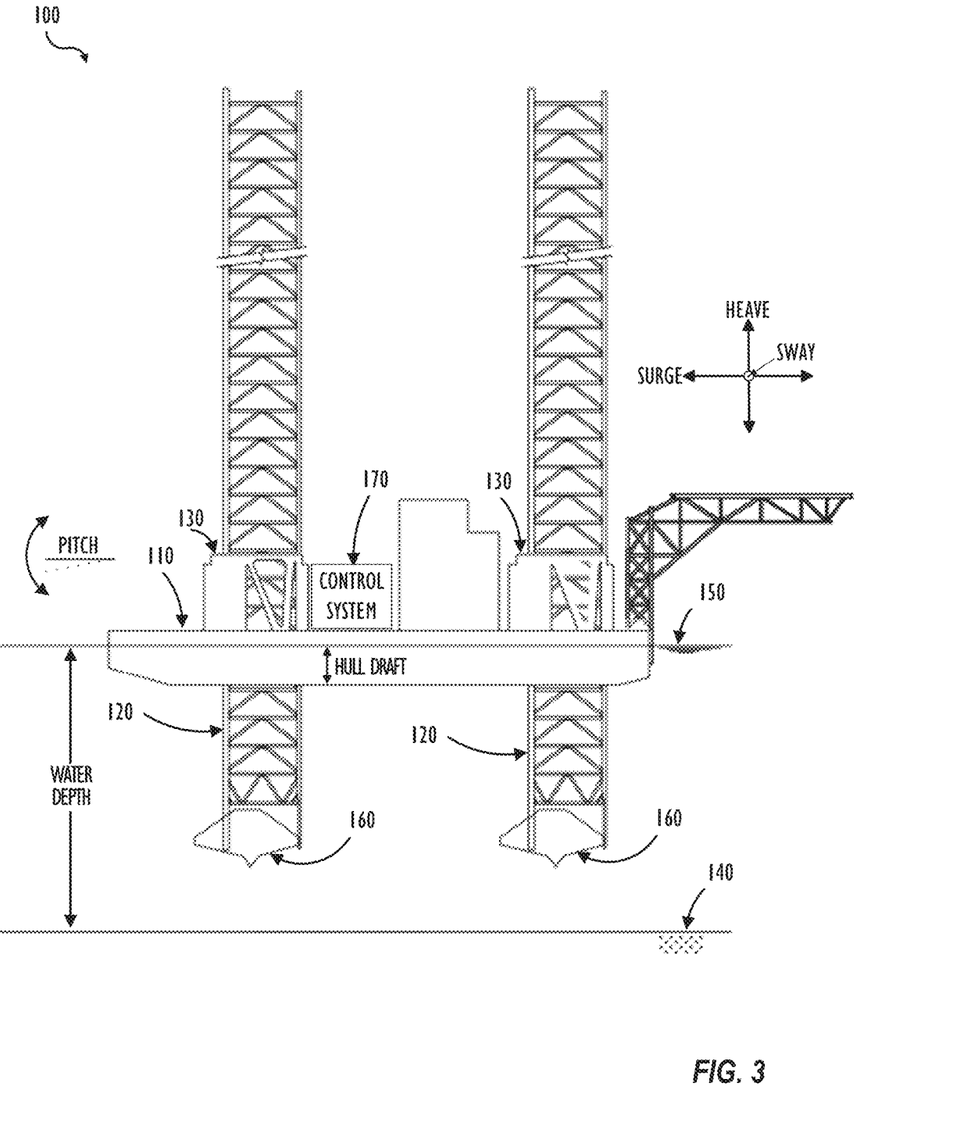
FIG. 3 shows, in profile view, a self-elevating vessel in an afloat state in accordance with one or more embodiments.

There is a time between when hull 110 is above waterline 150 and legs 120 support hull 110 in the elevated state (FIG. 1) and when buoyancy of hull 110 supports vessel 100 in the afloat state with legs 120 no longer in contact with seabed 140 (FIG. 3). During this transition period, the environment may cause motions of hull 110 or vessel 100 due to loads that may occur on one or more parts of vessel 100. More specifically, cyclic wave-induced loads may cause loading of legs 120 and elevating systems 130 to oscillate about their mean values due to static and buoyancy loads and steady wind/current-induced loads. Wave loads acting on the hull 110 or vessel 100 may transmit through elevating system 130 and legs 120 to seabed 140 as internal loads and may affect one or more parts of the vessel 100. Further, inertial loads transferred from their point of origin through elevating system 130 and legs 120 to seabed 140 may be induced by the cyclic nature of waves. These loads can damage one or more parts of vessel 100, and thus, allowable structural limits of load the vessel 100 can bear during coming off location operations must be established.

In one embodiment, control system 170 may be utilized for determining the feasibility of a coming off location operation for vessel 100 under given conditions. In addition, in some embodiments, control system 170 may also control at least a part of the coming off location operation. Control system 170 may operate to, for example, determine if vessel 100 is within predetermined acceptable operating limits for extracting vessel 100 off location based on a utilization ratio determined for given environmental, site and vessel 100 conditions and based on comparison of hull 110 motion data with permissible operating ranges. In one embodiment, control system 170 may be provided onboard vessel 100 to assist operating personnel in controlling operation of vessel 100 when coming off location. In one or more other embodiments, control system 170 may be partially provided onboard vessel 100 and partially on land (e.g., at a service center communicatively coupled to the onboard control system 170). Control system 170 may be coupled with onboard instrumentation (not specifically shown in FIG. 1) to obtain environmental information and motion information like surge, sway, heave, yaw, pitch and roll of vessel 100 when vessel 100 is subject to meteorology and (physical) oceanography (metocean) conditions (e.g., wind, current, wave energy). Control system 170 may also be coupled with land- and/or satellite-based instrumentation (e.g., weather data from satellites). In general, control system 170 may assist operating personnel in determining whether it is safe to come off location under given conditions by predicting whether structural loads exerted on vessel 100 in a given environment are within acceptable operating limits during the transition period for coming off location.

More specifically, control system 170 may perform structural analysis and establish the permissible operating ranges for coming off location by determining actual allowable structural limits of loads the vessel 100 can bear. Based on the determined acceptable operating limits, when vessel 100 is in the elevated state as shown in FIG. 1, control system 170 may initially output an indication to assist operating personnel in determining whether it is safe to lower vessel 100 into the water to begin a coming off location operation under given environmental, site and vessel conditions. The conditions may be actual, as-measured conditions measured using onboard instrumentation. In one embodiment, the control system 170 may first indicate it is safe to lower hull 110 to an intermediate hull draft (as shown in, for e.g., FIG. 2) that is less (or shallower) than a load-line hull draft (as shown in, for e.g., FIG. 3) of hull 110. While hull 110 is lowered to the intermediate hull draft, the control system 170 may again use onboard instrumentation to determine real-time hull motion (e.g., surge and sway motion of the hull) and compare the observed hull motion against established permissible operating ranges to determine whether the vessel's behavior is within the allowable structural limits. As used herein, and as shown in FIGS. 2-3, the term "hull draft" refers to the distance hull 110 is submerged in water under different conditions of legs 120. Based on this comparison, the control system 170 may further indicate it is safe to lower the hull 110 to a lower elevation or maximum hull draft to extract legs 120 from seabed 140 (e.g., a load-line hull draft of vessel 100 in the afloat state or a hull draft that is more than the load-line hull draft). Hull 110 may be lowered to a large draft (e.g., more than the load-line hull draft) in order to develop sufficient excess buoyancy and leg pulling force so as to retrieve or withdraw legs 120 from seabed 140. Also, soil stiffness at a given site from where vessel 100 is to be extracted may be layered with low stiffness near seabed 140 and to a considerable depth below, thereby causing large leg penetrations into the seabed. At such sites, larger leg-pulling forces may be required and therefore more of hull 110 may be required to be in the water. These sites may also require a longer time to get legs 120 unstuck from seabed 140.

Figure 4:
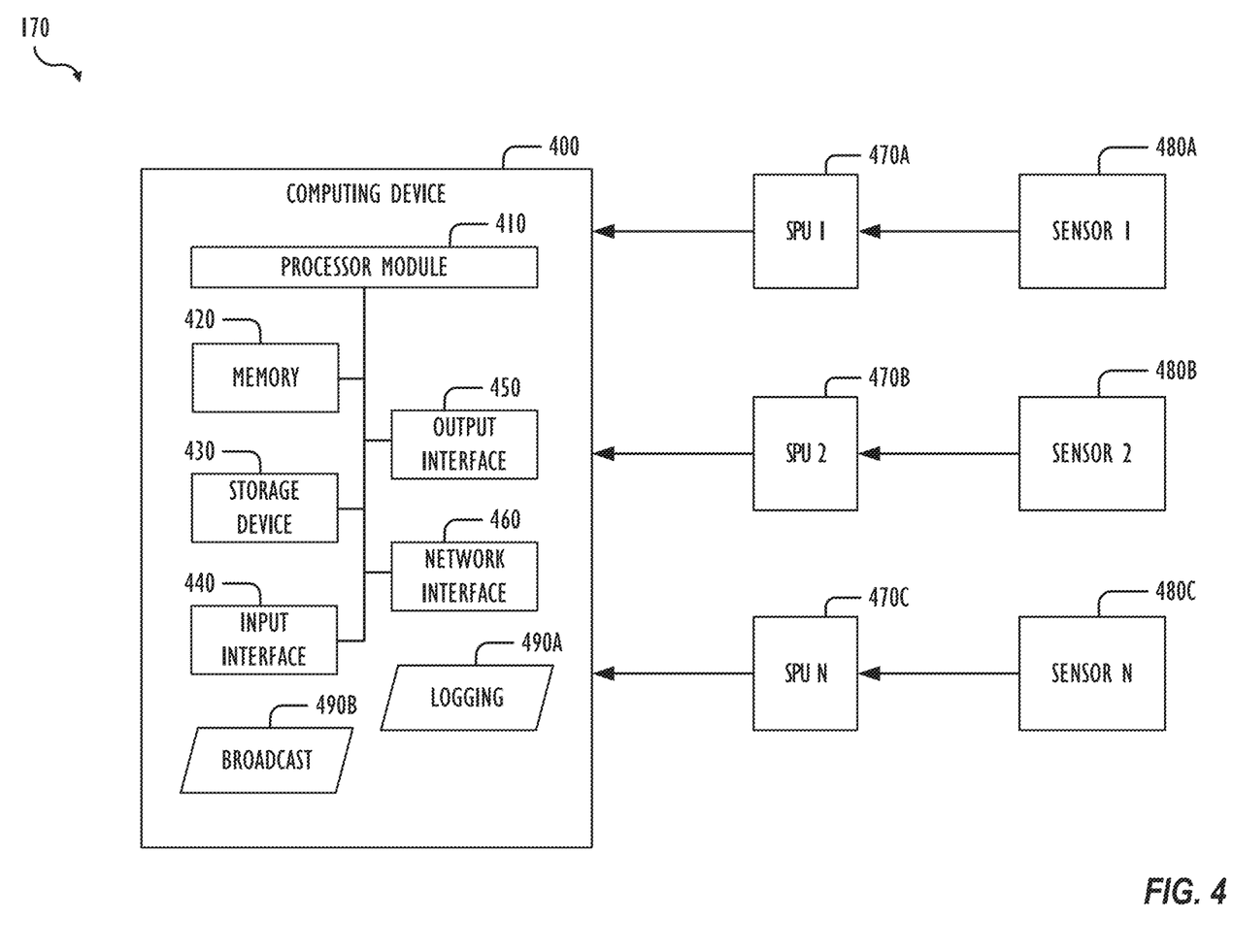
FIG. 4 shows, in block diagram form, a control system in accordance with one or more embodiments.

FIG. 4 shows a block diagram of control system 170 in accordance with one or more embodiments. As shown in FIG. 4, control system 170 includes computing device 400, a plurality of N signal processing units (SPUs), and a plurality of N sensors. In the example illustrated in FIG. 4, the N signal processing units include SPU 1 470A, SPU 2 470B, and SPU N 470N, and the N sensors include sensor 1 480A, sensor 2 480B, and sensor N 480N. Sensors 1-N 480A-480N may be coupled with computing device 400 via SPUs 1-N 470A-470N, respectively. Alternately, plural sensors may be coupled with computing device 400 via the same signal processing unit. Computing device 400 may include processor module 410, memory 420, storage device 430, input interface 440, output interface 450, and network interface 460. One or more components of control system 170 may be portable. For example, all of computing device 400, sensors 1-N 480A-480N, and SPUs 1-N 470A-470N may be portable and movable from vessel 100 to another vessel. Further, control system 170 may be provided on vessel 100. Alternately, one or more components of the control system 170 may be provided on vessel 100 and other components of control system 170 may be provided at one or more locations remote from the vessel 100 (e.g., a land-based remote monitoring center or as part of a cloud-based network).

Sensors 1-N 480A-480N may include one or more of a global positioning system (GPS) sensor, wind anemometer, navigation radar, sea surface scanning and measuring devices, motion sensor, motion reference unit (MRU), or other metocean sensor. Sensors 1-N 480A-480N may sense different conditions corresponding to vessel 100. For example, sensors 1-N 480A-480N may sense one or more of metocean conditions (e.g., wave energy, wave spectrum, wave height, wave period, wind speed, current speed, draft, salinity, air temperature, humidity); orientation conditions (e.g., directions from which wave energy—both wind-driven and swell—is coming from in a sea state relative to vessel's 100 heading); site conditions (e.g., soil properties of seabed 140 over which vessel 100 is stationed, water depth at the location of vessel 100, leg penetration depth indicative of how deep into seabed 140 legs 120 of vessel 100 penetrate); and vessel conditions (e.g., hull draft, inclination of hull 110, airgap between hull 110 and waterline 150). Sensors 1-N 480A-480N may be provided on hull 110, legs 120, or on footings 160. Alternately, one or more of sensors 1-N 480A-480N may be provided at a location distal to vessel 100 and communicatively coupled to computing device 400. Sensors 1-N 480A-480N may sense motion information (positional displacement) of one or more portions of the vessel 100 in response to the metocean conditions such as wind, wave and current. For example, one or more of sensors 1-N 480A-480N may sense motions about each of the hull's six-degrees of freedom (surge, sway, heave, yaw, pitch and roll) to calculate displacement of the hull 110. Computing device 400 may receive information from sensors 1-N 480A-480N via a wired connection or a wireless connection. In one embodiment, sensors 1-N 480A-480N include one or more MRUs that capture hull 110 motion data at periodic intervals and a sea surface scanning and measuring device. Data captured by the MRU may be processed and analyzed prior to being output to a user. The MRU may measure rotational velocities and translational accelerations which may be converted to hull 110 motions based on a constant of integration. The MRU may be provided onboard vessel 100 so that it is positioned at a center of floatation (COF) of vessel 100 to measure motion (e.g., surge and sway) of hull 110. Another MRU may be provided in a different part of vessel 100 to compensate for calculation of airgap performed by the sea surface scanning and measuring device (e.g., point-down wave height measurement device). Sensors 1-N 480A-480N may further include a navy grade navigation radar. Data output from the navigation radar may be processed by a corresponding signal processing unit (i.e., radar processing unit) to detect objects (e.g., ship) in a vicinity of vessel 100. Further, video output from the navigation radar based on a sweep operation may be processed by the radar processing unit to identify wave energy information (e.g., wave height, wave direction, wave period) that may be displayed and used during the coming off location operation. The radar may be positioned onboard vessel 100 so that a sweep angle of the radar may be at least 50°.

In one embodiment, computing device 400 may be a general purpose computer system such as a desktop, laptop, notebook or tablet computer system. Computing device 400 may also be a portable electronic device such as a Personal Digital Assistant (PDA) or a smartphone. Processor module 410, memory 420, storage device 430, input interface 440, output interface 450, and network interface 460 may be coupled to each other via system bus, backplane, or fabric. Processor module 410 may include one or more processing units each of which may include at least one central processing unit (CPU) and zero or more graphics processing units (GPUs); each of which in turn may include one or more processing cores. Each processing unit may be based on reduced instruction-set computer (RISC) or complex instruction set-computer (CISC) architectures or any other suitable architecture. Processor module 410 may be a single processor element, a system-on-chip, an encapsulated collection of integrated circuits (ICs), or a collection of ICs affixed to one or more substrates. Memory 420 may include one or more different types of media (typically solid-state) used by processor module 410. For example, memory 420 may include memory cache, read-only memory (ROM), and/or random access memory (RAM). Storage device 430 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 420 and storage device 430 may be used to retain media (e.g., audio, image and video files), structural analysis data, mathematical models, finite element models, hydrodynamic models, vessel 100 data, site data, metocean data, hull 110 motion data, structural analysis results data, algorithms, computer program instructions or code organized into one or more modules and written in any desired computer programming language, and any other suitable data. When executed by processor module 410 such computer program code may implement one or more of the methods and actions described herein. In one embodiment, computing device 400 may further include a logging 490A process for time-based storage of data generated by sensors 1-N 480A-480N. Thus, information generated by sensors 1-N 480A-480N including output GUI (screen) data representing the data generated by sensors 1-N 480A-480N and audio/video data may be subject to time-based storage in storage device 430. For example, metocean data (including radar video data) obtained by sensors 1-N 480A-480N and pinion load data indicating pinion load in elevating systems 130 determined based on a power output level of a motor of elevating systems 130 when pulling legs 120 out of seabed 140 may be subject to time-based storage. The logged data may be quickly and securely accessible for subsequent analysis, reporting, informed decision-making, and calibration of models that are used in performing the structural analysis to determine acceptable operating limits of vessel 100. For example, logging 490A process may be implemented using a historian data log that is compliant with the Object Linking and Embedding (OLE) for Process Control (OPC) standard.

Further, computing device 400 includes output interface 450 that may be a display (e.g., a liquid crystal display (LCD) or another type of display) that allows users to view images and other output generated by computing device 400. Output interface 450 may include a touch screen which allows users to interact with a graphical user interface (GUI) generated by one or more programs executed on computing device 400. In addition, or in the alternative, computing device 400 may transmit images to a display of another device, for example, a separate control system on vessel 100 or a device distal to vessel 100. Output interface 450 may include any audio, visual and/or other sensory interface that can be used by control system 170 to communicate information to the user. Computing device 400 may further include broadcast 490B process for broadcasting, via network interface 460 data obtained from sensors 1-N 480A-480N to multiple devices onboard vessel 100 and/or at one or more locations remote from vessel 100 (e.g., devices at onshore locations or other offshore locations). For example, computing device 400 may broadcast the data so that the data is securely accessible via a network such as the Internet. Computing device 400 may also include one or more input interfaces 440 (e.g., one or more of a keypad, mouse, touchpad, touchscreen, one or more switches, buttons, and the like) to allow a user to interact with computing device 400. It may be understood that a GUI may be a type of a user interface that allows a user to interact with computing device 400 and/or control system 170 through, for example, graphical icons, visual indicators, and the like. In one embodiment, input interface 440 may receive via network interface 460 data or instructions for operating vessel 100 during the coming off location operation. For example, the input interface 440 may receive metocean data that may be used for controlling operation of vessel 100. Alternately, or in addition, input interface 440 may also receive instructions from a remote location for operating vessel 100 during the coming off location operation based on data of sensors 1-N 480A-480N sent to the remote location via output interface 450. In one embodiment, logging 490A, data display, broadcast 490B and other functions (e.g., troubleshooting) provided by computing device 400 may be implemented using respective virtual machines running simultaneously and independently on computing device 400. In addition, computing device 400 may include network interface 460 to allow computing device 400 to interface with various other electronic devices and/or sensors 1-N 480A-480N. Network interface 460 may include a Bluetooth interface, a local area network (LAN) or wireless local area network (WLAN) interface, an Ethernet connection or the like. The network interface 460 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), Internet Message Access Protocol (IMAP), Modbus protocol, Process Field Net protocol (PROFINET), and Process Field Bus protocol (PROFIBUS)).

Figure 5:
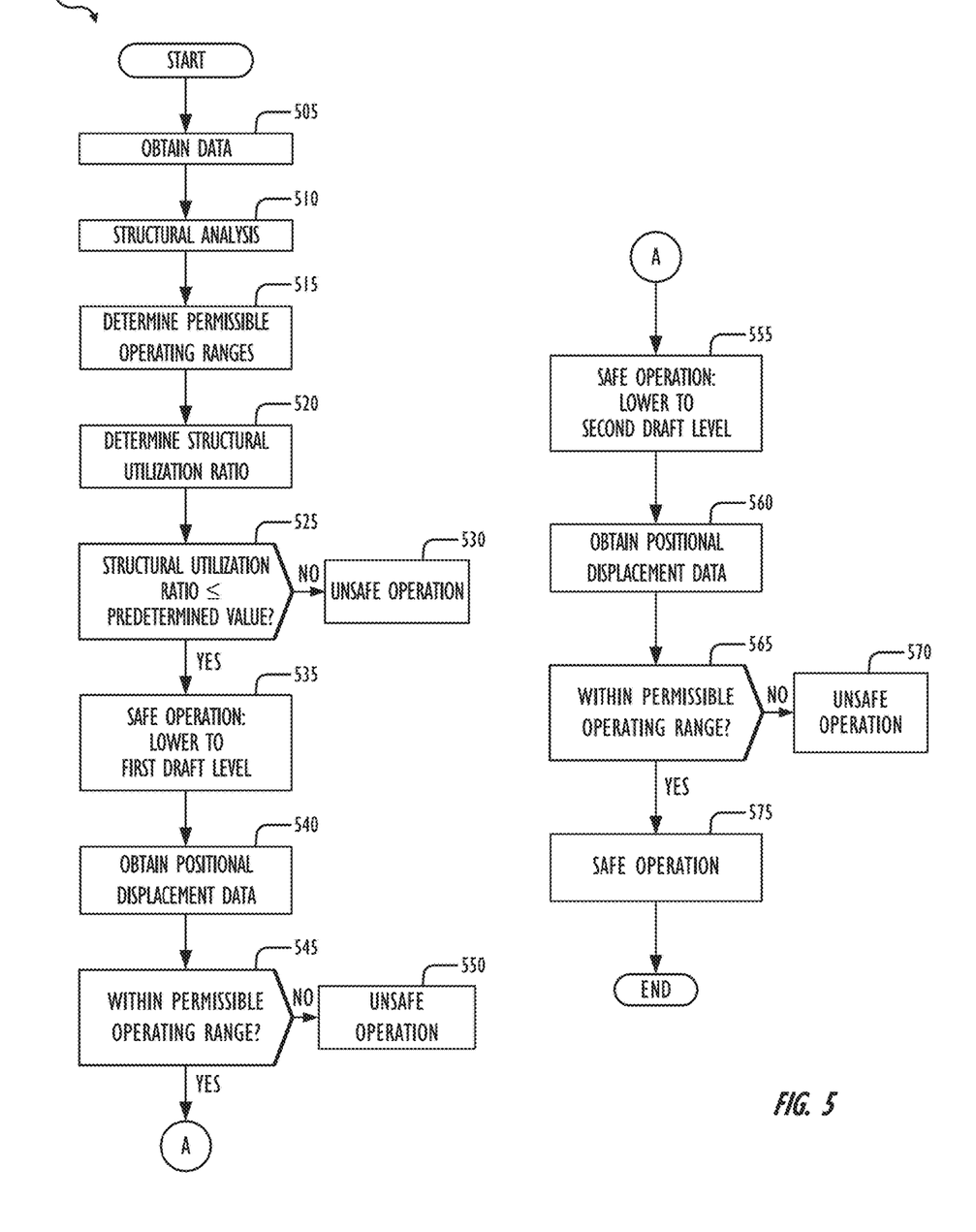
FIG. 5 shows, in flowchart form, operations of the control system in accordance with one or more embodiments.

Referring to FIG. 5, coming off location operation 500 illustrates actions control system 170 may take in accordance with one or more embodiments. Coming off location operation 500 begins at block 505 where control system 170 obtains data that is used in performing structural analysis of vessel 100. The data may be obtained from one or more sources including sensors 1-N 480A-480N, input interface 440, memory 420, storage device 430, and network interface 460. In one embodiment, the data may include one or more of the site conditions, the vessel conditions and (assumed) environmental conditions.

At block 510 the control system 170 performs a structural analysis of vessel 100 based on the data of site conditions, vessel conditions and (assumed) environmental conditions obtained at block 505. The structural analysis may include using a quasi-static structural analysis with dynamic amplification factors to predict stress levels and hull motions when hull 110 is in the water with legs 120 either fully stuck or partially stuck during the coming off location operation. The structural analysis may account for one or more of soil properties of seabed 140 on which vessel 100 is stationed, water depth at the location of vessel 100, leg penetration depth indicative of how deep into seabed 140 legs 120 of vessel 100 penetrate, airgap between hull 110 and waterline 150, hull 110 draft level, amplitude and direction of dominant wave energy—wind-driven or swell, inclination of hull 110, stiffness of elevating systems 130, and structural capacity of legs 120, hull 110 and the elevating systems 130. Wave energy may be thought of as including wind-driven wave components and swell components. In one embodiment, the structural analysis may be performed using regular waves when swells are dominant in the vessel's 100 local environment. The structural analysis may be performed using random waves when wind-driven waves are dominant in the vessel's 100 local environment. Alternately, the structural analysis may be performed using combinations of swells and wind-driven waves with different directions and periods. Control system 170 may determine whether the swells are dominant or the wind-driven waves are dominant based on data received from sensors 1-N 480A-480N. Alternately, this information may be provided by the user.

The structural analysis may further include performing a finite element analysis based on a mathematical model of vessel 100 to determine loads acting on vessel 100 under various assumed environmental conditions (e.g., wind speeds, wave energy, wave period, wave height, current, directions relative to vessel 100 from which the wind, wave and current energy are coming from) and specific site and vessel conditions (e.g., soil properties of seabed 140 over which vessel 100 is stationed, water depth at the location of vessel 100, leg penetration depth indicative of how deep into seabed 140 legs 120 of vessel 100 penetrate, airgap between hull 110 and waterline 150). The finite element analysis may include finite elements (e.g., beam elements, plate elements, and the like) that are representative of vessel's 100 entire structure. For example, while loads are being applied to the system due to the various assumed environmental conditions, the interaction of legs 120 with elevating systems 130 may be modeled when legs 120 are being pulled out of seabed 140 from fully stuck (at full penetration depth of legs 120 into seabed 140) or partially unstuck (less than the full penetration of legs 120 into seabed 140) positions during the coming off location operation. The structural analysis may further include performing hydrodynamic analysis of the vessel 100. For example, a hydrodynamic model may be created to compute the forces acting on the vessel 100 under the assumed environmental conditions. In performing the structural analysis, different soil stiffness conditions and damping values corresponding to one or more parts of vessel 100 or vessel/soil system may be assumed to predict hull 110 motions and wave loads on vessel 100 inducing the hull motions. For example, during a coming off location operation, soft clay conditions of the soil where vessel 100 is positioned may require large hull 110 overdraft and leg-by-leg pull-out efforts (due to, e.g., footings 160 being stuck). A site having soft clay soils with deep leg penetration and lengthy leg pulling operations presents risks associated with high pulling forces and extended exposure to the environment. Therefore, different soil stiffness models may be developed with respect to all legs 120 of vessel 100 being fully stuck or one or more legs being partially unstuck, and the structural analysis of vessel 100 may be performed based on the determined soil stiffness models. Maximum allowable structural limits of load the vessel 100 can bear may then be determined based on the analysis.

Once the conditions that produce the maximum allowable structural limits of load the vessel 100 can bear are identified, permissible wave height data may be prepared and these limiting conditions may be used to establish permissible hull offset envelopes at various hull 110 draft levels while legs 120 are being pulled for extraction, thereby determining one or more permissible operating ranges of vessel 100 at different hull drafts and/or foundation conditions (e.g., number of legs 120 fully/partially stuck/unstuck in seabed 140) (block 515). Thus, the permissible operating ranges of vessel 100 for coming off location may be determined based on actual allowable structural limits of load the vessel 100 can bear. That is, the permissible operating ranges for coming off location may be determined based on the structural analysis that is specific to the vessel 100. Permissible operating ranges may also be determined based on assumed load and foundation conditions that represent the worst case condition (e.g., soil stiffness and/or number of legs 120 fully/partially stuck/unstuck). Still further, the permissible operating ranges may be determined based on the vessel's 100 proximity to other infrastructure where vessel 100 is located. For example, the permissible operating ranges may be set to prevent contact between vessel 100 and any structural features of any proximal infrastructure (e.g., a platform). The permissible operating range(s) determined at block 515 may be displayed on a display.

At block 520 the control system 170 may obtain given site and vessel conditions (e.g., soil properties of seabed 140 on which vessel 100 is stationed, water depth at the location of vessel 100, and/or leg penetration depth indicative of how deep into seafloor 140 legs 120 of vessel 100 penetrate) and given environmental conditions (e.g., wind, current, wind-driven wave and swell energy, wind-driven wave and swell period, wind-driven wave and swell height, directions relative to vessel 100 the energy is coming from, a measure of how concentrated, or narrow-banded, the wind-driven wave and swell energy is in the vicinity of corresponding peak period) and determine a structural utilization ratio (Unity Check or "UC") based on the given site, vessel and environmental conditions. The given site and environmental conditions may be actual as-measured conditions obtained using onboard instrumentation (e.g., one or more sensors 1-N 480A-480N). In one embodiment, a maximum acceptable value for the structural utilization ratio may be 100% or 1.0 (i.e., "unity"). The structural utilization ratio may indicate whether the obtained site and environmental conditions may cause the vessel 100 to exceed its acceptable operating limits.

In one embodiment, the structural analysis may be performed well before coming off location operations are begun and results thereof indicating acceptable operating limits of vessel 100 (i.e., allowable structural limits of load the vessel 100 can bear) under different site and vessel conditions (e.g., soil properties of seabed 140 on which vessel 100 is stationed, water depth at the location of vessel 100, leg penetration depth indicative of how deep into seabed 140 legs 120 of vessel 100 penetrate, hull draft, inclination of hull 110, stiffness of elevating systems 130, and the structural capacity of legs 120, hull 110 and the elevating systems 130) and assumed environmental conditions (e.g., wave energy, wave period, wave height, wind, current, directions relative to the vessel 100 the energy is coming from) may be stored as a matrix of structural responses in storage device 430. For example, the analytical results may be stored in a lookup table in conjunction with the various site and vessel conditions and the assumed environmental conditions. At block 520 the control system 170 may then interpolate from the available stored matrix of results data to produce a condition-specific structural utilization ratio for vessel 100 under the given site, vessel and environmental conditions. Alternatively, the structural analysis at block 510 may be performed in real-time either on-board vessel 100 or with the assistance of an off-vessel system and the permissible operating ranges (block 515) and structural utilization ratio (block 520) may be determined based on the structural analysis performed in real-time. The environmental conditions obtained at block 520 may be as-measured or actual conditions at the site of vessel 100 obtained using onboard instrumentation (e.g., one or more sensors 1-N 480A-480N). Thus, control system 170 may determine actual wave energy using onboard instrumentation. The control system 170 may then determine a site-specific structural utilization ratio for a given combination of wind-driven waves and swells with different directions and periods. Alternately, the environmental conditions may be representative of a forecast of metocean conditions indicating what the conditions are predicted to be over a predetermined future period. The metocean conditions may be obtained from sensors 1-N 480A-480N or from an external source. Determination of the structural utilization ratio is further illustrated in GUI 700 of FIG. 7.

At block 525 the control system 170 determines whether the structural utilization ratio is less than or equal to a predetermined value. In one embodiment, vessel 100 may be in the elevated state at blocks 505-525 with hull 110 above waterline 150 as shown in FIG. 1. Based on the determination result at block 525, hull 110 may be lowered into the water. Thus, if control system 170 determines that the structural utilization ratio is less than or equal to a predetermined value ("YES" at block 525), control system 170 may indicate it is safe to lower vessel 100 from the elevated state to a first hull draft level (block 535). The first hull draft level may be an intermediate hull draft level which is less than a load-line hull draft level of hull 110. For example, the intermediate hull draft level of hull 110 may be 8-10 feet. If control system 170 determines that the calculated structural utilization ratio is greater than the predetermined value ("NO" at block 525), control system 170 may indicate it is unsafe to continue the coming off location operation (i.e., it is unsafe to lower vessel 100 into water from the elevated state. Coming off location operations are not to be carried out until environmental conditions improve) (block 530). For example, at block 530 control system 170 may generate an alarm that may be displayed on a display to indicate that coming off location operations are not to be carried out or continued. Control system 170 at block 530 may also be programmed to automatically maintain vessel 100 at the elevated state or to begin raising vessel 100 to the elevated state without any operation by a user. In one embodiment, at block 535 control system 170 may be programmed to automatically begin lowering vessel 100 from the elevated state to the first hull draft level without any operation by a user. In another embodiment, control system 170 may simply signal the user that it is safe to lower vessel 100 into the water at block 535.

At block 540 the control system 170 may obtain positional displacement data of hull 110 while hull 110 is at the first hull draft level. The positional displacement data may be measured by instrumentation onboard vessel 100 (e.g., sensors 1-N 480A-480N) while hull 110 is at the first hull draft level. Further, at block 540 watertight integrity of hull 110 may be checked for a predetermined period of time (e.g., 30 mins), during which control system 170 may obtain the positional displacement information of hull 110 at the first hull draft level. The watertight integrity check may encompass checking if there is any damage to hull 110 that may cause hull 110 to take on water and checking for leakage in sea valves connected to hull 110. In one embodiment, surge/sway motion values for the hull 110 may be obtained as the positional displacement data. The surge/sway motion values may be real-time as-measured values provided by sensors 1-N 480A-480N (e.g., MRU). The positional displacement data may be measured at block 540 for at least a predetermined period of time. For example, the positional displacement data may be measured for at least 10 minutes. The positional displacement data may also be measured periodically. For example, the displacement data may be measured every second.

At block 545 the obtained positional displacement data at the first hull draft level may be compared with a first permissible operating range (determined, for example, at block 515) to determine whether the obtained positional displacement data at the first hull draft level is within a threshold defined by the first permissible operating range. By way of example, the positional displacement data at the first hull draft level may be determined to be within a threshold defined by the first permissible operating range when hull 110 motion data are within the threshold defined by the first range. In other words, if any current hull 110 motion data are outside the threshold defined by the first range, it may be determined that the positional displacement data at the first hull draft level is not within the threshold. The positional displacement data at the first hull draft level and the first permissible operating range may be presented on a display to assist a user in the comparison. In one embodiment, the user may then make the determination regarding whether the obtained positional displacement data at the first hull draft level is within the threshold. In another embodiment, the control system 170 may make the determination regarding whether the obtained positional displacement data at the first hull draft level is within the threshold without any assistance of the user and output a result of the determination via the output interface 450. At block 545 the comparison may be performed for a predetermined period of time (for e.g., throughout the period for performing the watertight integrity check) while results of the comparison are being continuously output to the user.

If it is determined that the obtained positional displacement data at the first hull draft level is within a threshold defined by the first permissible operating range ("YES" at block 545), control system 170 may indicate it is safe to lower vessel 100 from the first hull draft level to a second hull draft level (block 555). The second hull draft level may be a maximum hull draft level which is equal to or more than the load-line hull draft level of hull 110. For example, the maximum hull draft level of hull 110 may be 3-4 feet greater than the load-line hull draft level of hull 110 or, in one specific example, around 21 feet. Further, at block 555 the control system 170 may be programmed to automatically begin lowering vessel 100 from the first hull draft level to the second hull draft level upon confirming that the watertight integrity check has been completed successfully, without any operation by a user. In another embodiment, at block 555 the control system 170 may simply signal the user that it is safe to lower the vessel 100 further down to the second hull draft level. On the other hand, if it is determined that the obtained positional displacement data at the first hull draft level is not within a threshold defined by the first permissible operating range ("NO" at block 545), control system 170 may indicate it is unsafe to continue the coming off location operation (i.e., it is unsafe to lower vessel 100 from the first hull draft level to the second (deeper) hull draft level) (block 550). At block 550, control system 170 may further indicate vessel 100 should be raised from the first hull draft level to the elevated state having the positive airgap. In one embodiment, at block 550 the control system 170 may be programmed to automatically begin elevating vessel 100 from the first hull draft level to a hull draft level shallower than the first hull draft level or to the elevated state without any operation by a user. In another embodiment, control system 170 may simply signal the user to jack vessel 100 up from the first hull draft level to a hull draft level shallower than the first hull draft level or to the elevated state out of the water at block 550. If the positional displacement data exceeds the threshold defined by the first permissible operating range, it does not mean vessel 100 is being overstressed. Instead, it means that if operations move to the next stage to reach the second (deeper) hull hull draft level, the expectation is that the stress levels on legs 120 and/or elevating systems 130 will be higher than the allowable structural limits of load the vessel 100 can bear. In this case, the coming off location operation may not be continued.

At block 560 the control system 170 may obtain positional displacement data of hull 110 while hull 110 is at the second hull draft level. The positional displacement data may be measured by instrumentation onboard vessel 100 (e.g., sensors 1-N 480A-480N) while hull 110 is at the second hull draft level. In one embodiment, surge/sway motion values for hull 110 may be obtained as the positional displacement data. The surge/sway motion values may be real-time as measured by sensors 1-N 480A-480N. The positional displacement data may be measured periodically. For example, the displacement data may be measured every second.

At block 565 the obtained positional displacement data at the second hull draft level may be compared with a second permissible operating range (determined, for example, at block 515) to determine whether the obtained positional displacement data at the second hull draft level is within a threshold defined by the second permissible operating range. By way of example, the positional displacement data at the second hull draft level may be determined to be within a threshold defined by the second permissible operating range when hull 110 motion data are within the threshold defined by the second range. In other words, if any current hull 110 motion data are outside the threshold defined by the second range, it may be determined that the positional displacement data at the second hull draft level is not within the threshold. The second permissible operating range may be different from (e.g., larger than) the first permissible operating range. In one embodiment, when it is determined that the obtained positional displacement data at the first hull draft level is within the threshold defined by the first range ("YES" at block 545), positional displacement data while vessel 100 is being lowered from the first hull draft level to the second hull draft level may be obtained and compared with the second permissible operating range to determine ongoing safety of the leg pulling operations. In an alternate embodiment, the positional displacement data while the vessel 100 is being lowered from the first hull draft level to the second hull draft level may be obtained and compared with a permissible operating range other than the first and second permissible operating ranges. The positional displacement data at the second hull draft level and the second permissible operating range may be displayed on a display to assist a user in the comparison. In one embodiment, the user may then make the determination regarding whether the obtained positional displacement data at the second hull draft level is within the threshold. In another embodiment, control system 170 may make the determination regarding whether the obtained positional displacement data at the second hull draft level is within the threshold without any assistance of the user and output a result of the determination via output interface 450. At block 565, the comparison may be performed for a predetermined period of time while results of the comparison are being continuously output to the user.

If it is determined that the obtained positional displacement data at the second hull draft level is within a threshold defined by the second permissible operating range ("YES" at block 565), control system 170 may indicate it is safe to continue the coming off location operation (block 575). If it is determined that the obtained positional displacement data at the second hull draft level is not within a threshold defined by the second permissible operating range ("NO" at block 565), control system 170 may indicate it is unsafe to continue the coming off location operation (i.e., it is unsafe to keep vessel 100 in the water at the second hull draft level) (block 570). Control system 170 at block 570 may further indicate to a user to raise vessel 100 from the second hull draft level to a hull draft level shallower than the second hull draft level or to the first hull draft level or to the elevated state having a positive airgap. In one embodiment, at block 570 the control system 170 may be programmed to begin elevating vessel 100 from the second hull draft level to a hull draft level shallower than the second hull draft level or to the first hull draft level or to the elevated state automatically without any operation by a user. In this case, before elevating vessel 100, control system 170 may also be programmed to lower any legs 120 that may have been raised from their pre-loaded position off seabed 140. In another embodiment, at block 570 the control system 170 may simply signal the user to jack vessel 100 up to a hull draft level shallower than the second hull draft level or to the first hull draft level or completely out of water in the elevated state. In this case, before elevating vessel 100, control system 170 at block 570 may also signal the user to lower any legs 120 that may have been raised from their pre-loaded position off seabed 140. Further, at block 575 the control system 170 may be programmed to continue coming off location operations of the vessel 100 automatically without any operation by a user. In this case, control system 170 at block 575 may be further programmed to begin raising legs 120 off seabed 140 automatically without any user operation. In another embodiment, at block 575 the control system 170 may simply signal the user that it is safe to continue the coming off location operations of vessel 100. In this case, control system 170 may further signal the user to begin pulling legs 120 off seabed 140.

Figure 6:
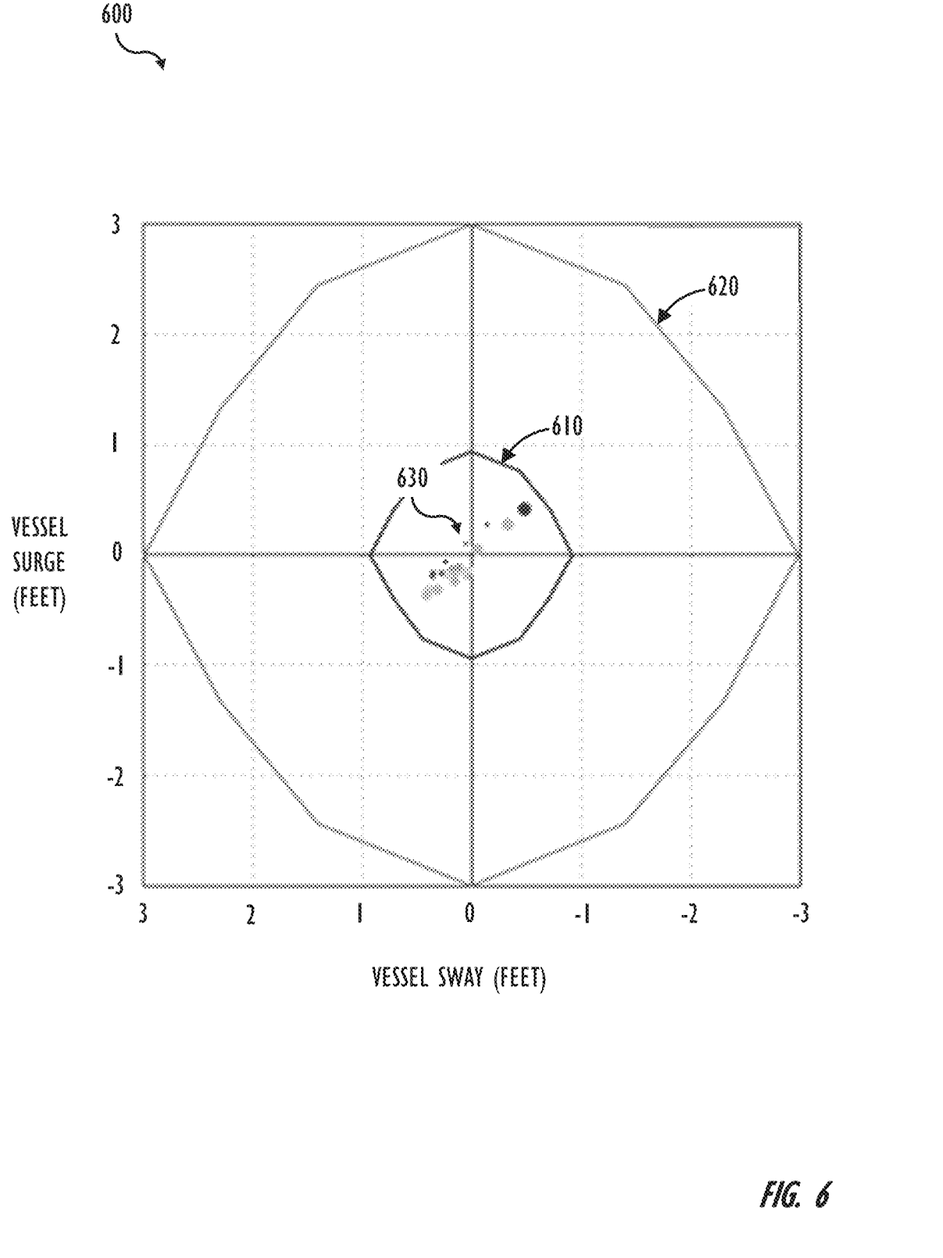
FIG. 6 shows permissible operating ranges in accordance with one or more embodiments.

FIG. 6 shows exemplary permissible operating ranges 600 (e.g., as determined at block 515 of FIG. 5) in accordance with one or more embodiments. The permissible operating ranges 600 may be displayed as watch circles for use during different stages of the coming off location operation. The watch circles may visually display the permissible operating ranges (i.e., limit of displacement) for hull 110 motion (e.g., surge and sway motions of hull 110) for different hull draft conditions and/or vessel 100 foundation conditions (e.g., number of legs 120 that are fully/partially stuck/unstuck). In one embodiment, as shown in FIG. 6, the abscissa represents a sway motion of hull 110 (measured in feet) while the ordinate represents a surge motion of hull 110 (measured in feet). Two (or one or three or more) watch circles may be displayed. Watch circle 610 may correspond to a permissible operating range for positional displacement of hull 110 while at a first hull draft level and/or a first foundation condition. Watch circle 620 may correspond to a permissible operating range for positional displacement of hull 110 while at a second hull draft level and/or a second foundation condition. Thus, multiple watch circles may be provided for the same hull draft level and different foundation conditions. For example, one watch circle may be generated for use at the start of coming off location operations when all legs 120 are fully stuck and another watch circle may be generated for use when the legs 120 are no longer fully stuck.

In one embodiment, positional displacement data 630 may be displayed superimposed on the watch circles to facilitate comparison of the positional displacement data against the appropriate watch circle. Positional displacement data 630 may indicate real-time surge/sway motions of hull 110 relative to a predetermined hull position. Positional displacement data 630 may be periodically obtained from sensors 1-N 480A-480N at a predetermined interval (e.g., every second) and displayed in real-time. Further, as shown in FIG. 6, plural positional displacement data points may be simultaneously displayed corresponding to a most recent predetermined period of time, thereby facilitating hull motion predictions based on the displayed data points and an understanding of variations and/or trends in the motions over time. In the positional displacement data 630 shown in FIG. 6, a largest dot may represent a current positional displacement and a smallest dot may represent a positional displacement associated with a specified time in the past. Although illustrated in FIG. 6 as watch circles, the permissible operating ranges may be represented in any reasonable way so long as comparison of the real-time as-measured hull motions with the corresponding permissible operating ranges during a coming off location operation can be facilitated.

Positional displacement data 630 shown in FIG. 6 may convey to the user how close vessel 100 is to the defined acceptable operating limit, based on the corresponding site-specific watch circles. Conventionally, personnel responsible for extraction of vessel 100 would have to use their best judgement and experience to estimate the metocean conditions and expected loads on legs 120 and elevating systems 130. With the techniques described herein, actual hull 110 response measurements (surge/sway motions) from onboard instrumentation may be compared against the corresponding watch circle, removing most of the subjective analysis and conservatism of conventional coming off location assessments. Further, when comparing the as-measured motions at an intermediate hull draft level with a corresponding watch circle, if the as-measured motions happen to exceed the predicted values, as long as the as-measured motions do not also exceed the watch circle at maximum hull draft when all legs are fully stuck, the stress levels on vessel 100 are still below the allowable structural limits, since the intermediate watch circle is established based on the expected hull motions at a maximum hull draft level. Still further, if the as-measured hull 110 motion data at the intermediate hull draft level indicates displacement outside the intermediate watch circle, the vessel 100 can be jacked back up fairly quickly without damage to the vessel 100. By using as-measured hull 110 motions and comparing them against corresponding permissible operating ranges, the coming off location assessment fully accounts for whether the sea state is dominated by wind-driven waves or swells and also fully accounts for soil conditions and wave spreading. Conventionally, since a single set of limiting values were used for defining the acceptable operating limits for coming off location, these limits would have to be the most conservative. However, since the allowable structural limits for coming off location vary considerably based on different conditions (e.g., water depth, wave period, direction of environment, and the like) and since the present technique develops the allowable structural limits based on the different conditions, the acceptable operating limits can be developed that allow for a greater range of conditions for which the vessel 100 can be taken off location.

Figure 7:
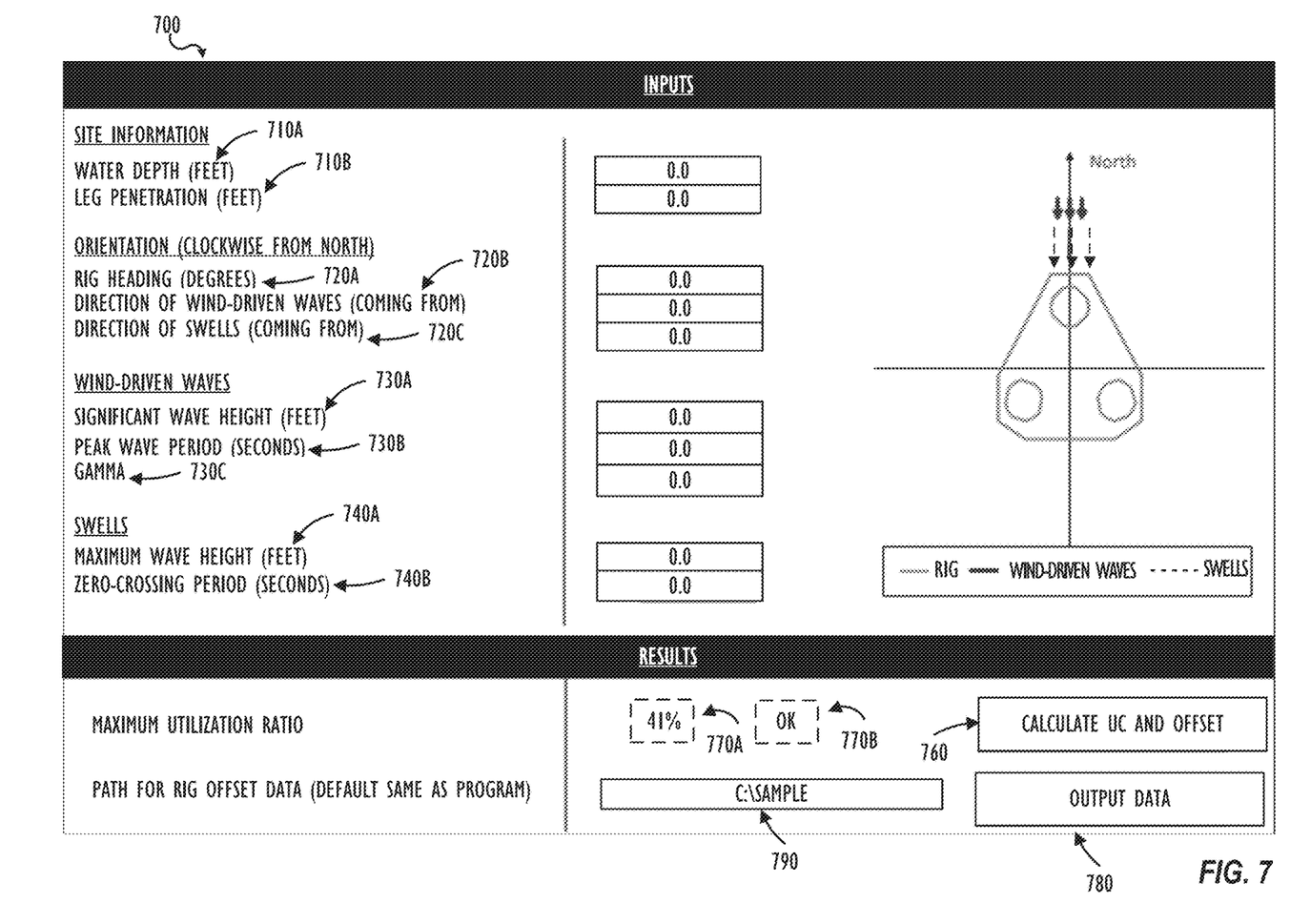
FIG. 7 shows a screen shot of a graphical user interface (GUI) in accordance with one or more embodiments.

FIG. 7 shows a screen shot of graphical user interface (GUI) 700 in accordance with one or more embodiments. GUI 700 may be displayed on a display in conjunction with making a decision for coming off location. GUI 700 may include one or more user interactive screens that allow for a user to interact with a program of control system 170 executing one or more of the operations described in FIG. 5. GUI 700 may indicate to a user that computing device 400 is available to receive input values 710A-740B from a user (e.g., via input interface 440) to control GUI 700. In one embodiment, GUI 700 may receive one or more of input values 710A-740B from one or more sensors 1-N 480A-480N. For example, GUI 700 may receive input values 720B-740B as actual, as-measured values from the navigation radar. Alternately, GUI 700 may receive input values 720B-740B as forecast values of what the conditions are predicted to be over a predetermined future period.

As illustrated, input value 710A corresponds to water depth (e.g., the depth of water from waterline 150 to seabed 140) and input value 710B corresponds to a leg penetration amount (e.g., leg penetration depth indicative of how deep into seabed 140 legs 120 of vessel 100 are penetrated). It should be noted that input value 710B may correspond to, for example, an input for multiple leg 120 penetration values, a single (e.g., average) penetration value for all legs 120, and/or independent inputs for one or more leg 120 penetration values, which may be of use when different legs 120 may have one or more different leg penetration values. Input values 720A-C correspond to orientation conditions of vessel 100 and may be represented by three (3) parameters —a rig heading 720A (e.g., a compass direction in which the rig's bow or nose is pointed), a direction of wind-driven waves 720B, and a direction of swells 720C (e.g., directions from which the wind-driven waves and swells are coming relative to the vessel's 100 heading or relative to true North). As shown in FIG. 7, input values 720A-C may also be displayed visually. Input values 730A-C and 740A-B may correspond to wave energy (which may be thought of as including wind-driven wave components 730A-C and swell components 740A-B) and may be represented by the following parameters—significant wave height (Hs), peak spectral period (Tp), peakedness parameter (gamma), maximum wave height (Hmax), and zero-crossing period (Tz).

Input values 710A-740B may be manually entered by the user into GUI 700. Alternately or in addition, computing system 400 may obtain one or more of input values 710A-740B as actual, as-measured values from the onboard instrumentation (e.g., sensors 1-N 480A-480N) and/or storage device 430 and automatically enter them into GUI 700. While input values 710A-740B are illustrated in FIG. 7, it is appreciated that a fewer number or greater number of input values may be displayed in connection with GUI 700. Additionally and/or alternately, other conditions separate from or in addition to those described above may correspond to input values 710A-740B. Operational commands 760 and 780 may also be present in GUI 700. Operational command 760 may correspond to an instruction to calculate UC and offset to instruct control system 170 to determine the structural utilization ratio (UC) and the one or more permissible operating ranges based on one or more of input values 710A-740B. Operational command 780 may correspond to an instruction to control system 170 to output offset data (e.g., watch circle data) to a predetermined location 790 that may be provided by the user.

Prior to commencing the coming off location operation, when the user activates operational command 760 (e.g., a button to calculate UC and Offset), control system 170 may output one or more permissible operating ranges that are determined based on at least input values 710A-B. For example, control system 170 may produce watch circles (as shown in FIG. 6) at one or more hull draft levels and/or foundation conditions (e.g., number of legs 120 fully/partially stuck/unstuck in the seabed 140) to be used while legs 120 of vessel 100 are being pulled for extraction. Further, when the user operates on operational command 760, control system 170 may determine a maximum structural utilization ratio of vessel 100 under the conditions specified by input values 710A-740B. Control system 170 may output the determined structural utilization ratio as output values 770A-B. Output value 770A may be represented as a percentage value to be compared against a maximum acceptable value (e.g., 100%). In GUI 700 shown in FIG. 7, since the calculated structural utilization ratio is 41% (i.e., less than or equal to the maximum acceptable value of 100%), control system 170 may output indication 770B (e.g., "OK") indicating that it is safe to continue the coming off location operation and lower vessel 100 into the water. When the user operates operational command 780 (e.g., a button to output data), a file containing data corresponding to the calculated permissible operating ranges is output to a predetermined location 790 that may be selectable by the user. For example, the file may be a Microsoft Excel® file containing coordinate pairs for generating the one or more watch circles on a display of computing device 400. (EXCEL is a registered trademark of the Microsoft Corporation.)

In one embodiment, in order to improve the structural analysis (at block 510 of FIG. 5) that goes into determining the permissible operating ranges and the structural utilization ratio, confirmations or deviations of observed conditions/responses may be logged to calibrate the mathematical models used in performing the structural analysis. Such calibration may result in more accurate mathematical models, thereby increasing the accuracy of the predictions on the response of vessel 100 under different conditions and the resulting permissible operating ranges. As more and more data representing actual motions for site-specific soils and environmental conditions (e.g., wind, wave, current and their individual directions relative to vessel 100 heading) is collected, the mathematical models may be refined to better predict the structural limits of vessel 100. For example, assumed soil stiffness conditions and damping values for one or more parts of vessel 100 may be adjusted based on a comparison between hull 110 motions predicted during the structural analysis and actual hull 110 motions as-measured by the onboard instrumentation during coming off location operations. In one embodiment, one or more of the following data points may be logged for calibration of the structural analysis models: loads on elevating systems 130, hull draft levels, hull inclinations, maximum wave height, period, direction, indication of whether the seas were wind-driven wave dominated or swell dominated, position of one or more of legs 120, start/end of jacking, start/end of jetting, and vessel 100 displacement motions.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of elements shown in FIGS. 1-4, the arrangement of steps or actions shown in FIG. 5 or the arrangement of (input/output) data shown in FIGS. 6 and 7 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A multi-stage coming off location system, comprising:
a first interface configured to receive sensor output indicative of a positional displacement of a self-elevating vessel; and
one or more processors communicatively coupled to the first interface, wherein the one or more processors when in operation:
obtain data of first and second sets of conditions corresponding to the self-elevating vessel,
determine a first permissible operating range of the self-elevating vessel based on a first structural analysis of the self-elevating vessel under the data of the first set of conditions, the first permissible operating range corresponding to a first hull draft level of the self-elevating vessel, determine a structural utilization ratio of the self-elevating vessel based on a second structural analysis of the self-elevating vessel under the data of the first and second sets of conditions, determine it is safe to lower the self-elevating vessel from an elevated state having a positive airgap to the first hull draft level that eliminates the positive airgap as a first stage in a coming off location operation of the self-elevating vessel when the structural utilization ratio is less than a predetermined value, obtain first positional displacement data from the first interface subsequent to the one or more processors determining that it is safe to lower the self-elevating vessel to the first hull draft level, the first positional displacement data separate from the structural utilization ratio of the self elevating vessel and corresponding to the positional displacement of the self-elevating vessel while the self-elevating vessel is at the first hull draft level, present the first positional displacement data in relation to the first permissible operating range of the self-elevating vessel, and indicate it is safe to lower the self-elevating vessel from the first hull draft level to a second, deeper, hull draft level as a second stage in the coming off location operation of the self-elevating vessel when the first positional displacement data separate from the structural utilization ratio of the self elevating vessel indicates that the positional displacement of the self-elevating vessel while at the first hull draft level is within the first permissible operating range.

2. The system according to claim 1, wherein the one or more processors are further configured to obtain second positional displacement data from the first interface, the second positional displacement data corresponding to the positional displacement of the self-elevating vessel while the self-elevating vessel is at the second hull draft level or is being lowered from the first hull draft level to the second hull draft level.

3. The system according to claim 2, wherein the one or more processors are further configured to:
determine a second permissible operating range of the self-elevating vessel based on the first structural analysis of the self-elevating vessel under the data of the first set of conditions, the second permissible operating range corresponding to the second hull draft level,
present the second positional displacement data in relation to the second permissible operating range of the self-elevating vessel, and
indicate it is safe to maintain the self-elevating vessel at the second hull draft level when the second positional displacement data indicates that the positional displacement of the self-elevating vessel while at the second hull draft level is within the second permissible operating range.

4. The system according to claim 3, wherein the one or more processors are further configured to automatically maintain the self-elevating vessel at the second hull draft level when the second positional displacement data indicates that the positional displacement of the self-elevating vessel is within the second permissible operating range.

5. The system according to claim 3, wherein the one or more processors are further configured to indicate that the self-elevating vessel be raised from the second hull draft level to a higher elevation when the second positional displacement data indicates that the positional displacement of the self-elevating vessel is not within the second permissible operating range.

6. The system according to claim 5, wherein the one or more processors are further configured to automatically raise the self-elevating vessel from the second hull draft level to the higher elevation when the second positional displacement data indicates that the positional displacement of the self-elevating vessel is not within the second permissible operating range.

7. The system according to claim 1, wherein the one or more processors are further configured to automatically lower the self-elevating vessel from the elevated state having the positive airgap to the first hull draft level that eliminates the positive airgap when the structural utilization ratio is less than the predetermined value.

8. The system according to claim 1, wherein the one or more processors are further configured to automatically lower the self-elevating vessel from the first hull draft level to the second hull draft level when the first positional displacement data indicates that the positional displacement of the self-elevating vessel while at the first hull draft level is within the first permissible operating range.

9. The system according to claim 1, wherein the one or more processors are further configured to indicate that the self-elevating vessel be raised from the first hull draft level to a higher elevation when the first positional displacement data indicates that the positional displacement of the self-elevating vessel while at the first hull draft level is not within the first permissible operating range.

10. The system according to claim 9, wherein the one or more processors are further configured to automatically raise the self-elevating vessel from the first hull draft level to the higher elevation when the first positional displacement data indicates that the positional displacement of the self-elevating vessel while at the first hull draft level is not within the first permissible operating range.

11. The system according to claim 1, wherein the first interface is configured to receive the sensor output that indicates surge and sway motion of the self-elevating vessel.

12. The system according to claim 1, further comprising one or more motion reference units for determining the positional displacement of the self-elevating vessel based on a center of floatation of the vessel.

13. The system according to claim 1, wherein a first one of the one or more processors is located at a land-based remote monitoring center and a second one of the one or more processors is located on-board the self-elevating vessel.

14. The system according to claim 1, wherein each of the first and second sets of conditions include at least one of site conditions, vessel conditions, orientation conditions, and metocean conditions of the self-elevating vessel.

15. The system according to claim 14, wherein the site conditions include at least one of soil properties of seabed on which the self-elevating vessel is stationed, water depth where the self-elevating vessel is stationed, and an initial leg penetration depth indicative of how deep into the seabed legs of the self-elevating vessel penetrate.

16. The system according to claim 14, wherein the vessel conditions include at least one of hull draft level, hull inclination, elevating system stiffness, number of legs of the self-elevating vessel that are fully stuck in seabed, and structural capacity of one or more of the legs, hull and the elevating system of the self-elevating vessel.

17. The system according to claim 14, wherein the orientation conditions include at least one of a heading direction of the self-elevating vessel and wave energy directions.

18. The system according to claim 14, wherein the metocean conditions include at least one of wave energy spectrum, wave period, wave height, wind speed, and current speed.

19. The system according to claim 1, wherein the structural analysis of the self-elevating vessel includes at least one of a finite element analysis and a hydrodynamic analysis of the self-elevating vessel.

20. The system according to claim 1, wherein the one or more processors are further configured to display a first watch circle for visually representing the first permissible operating range of the self-elevating vessel to a user.

21. The system according to claim 20, wherein the one or more processors are further configured to broadcast the first watch circle representing the first permissible operating range to a portable electronic device.

22. The system according to claim 1, further comprising one or more sensors that sense as-measured orientation conditions and metocean conditions corresponding to the self- elevating vessel as the second set of conditions.

23. The system according to claim 22, wherein the system is portable.

24. A non-transitory computer readable recording medium having a computer readable program stored thereon that is executable by one or more processors to perform multi-stage coming off location operations, comprising:
receiving sensor output indicative of a positional displacement of a self-elevating vessel;
obtaining data of first and second sets of conditions corresponding to the self-elevating vessel;
determining a first permissible operating range of the self-elevating vessel based on a first structural analysis of the self-elevating vessel under the data of the first set of conditions, the first permissible operating range corresponding to a first hull draft level of the self-elevating vessel; determining a structural utilization ratio of the self-elevating vessel based on a second structural analysis of the self-elevating vessel under the data of the first and second sets of conditions;
determining it is safe to lower the self-elevating vessel from an elevated state having a positive airgap to the first hull draft level that eliminates the positive airgap as a first stage in a coming off location operation of the self-elevating vessel when the structural utilization ratio is less than a predetermined value;
obtaining, subsequent to determining that it is safe to lower the self-elevating vessel to the first hull draft level, first positional displacement data separate from the structural utilization ratio of the self elevating vessel and indicative of the positional displacement of the self-elevating vessel while the vessel is at the first hull draft level;
presenting the first positional displacement data in relation to the first permissible operating range of the self-elevating vessel; and
indicating it is safe to lower the self-elevating vessel from the first hull draft level to a second, deeper, hull draft level as a second stage in the coming off location operation of the self-elevating vessel when the first positional displacement data separate from the structural utilization ratio of the self elevating vessel indicates that the positional displacement of the self-elevating vessel while at the first hull draft level is within the first permissible operating range.

25. A self-elevating vessel, comprising:
a hull adapted to float;
a plurality of legs extending substantially perpendicular to the hull; and
a multi-stage coming off location system, comprising:
  a positional displacement sensor that senses a positional displacement of a self-elevating vessel; and
  one or more processors communicatively coupled to the positional displacement sensor, wherein the one or more processors when in operation:
    obtain data of first and second sets of conditions corresponding to the self-elevating vessel,
    determine a first permissible operating range of the self-elevating vessel based on a first structural analysis of the self-elevating vessel under the data of the first set of conditions, the first permissible operating range corresponding to a first hull draft level of the self-elevating vessel,
    determine a structural utilization ratio of the self-elevating vessel based on a second structural analysis of the self-elevating vessel under the data of the first and second sets of conditions,
    determine it is safe to lower the self-elevating vessel from an elevated state having a positive airgap to the first hull draft level that eliminates the positive airgap as a first stage in a coming off location operation of the self-elevating vessel when the structural utilization ratio is less than a predetermined value,
    obtain first positional displacement data from the positional displacement sensor subsequent to the one or more processors determining that it is safe to lower the self-elevating vessel to the first hull draft level, the first positional displacement data separate from the structural utilization ratio of the self elevating vessel and corresponding to the positional displacement of the self-elevating vessel while the self-elevating vessel is at the first hull draft level,
    present the first positional displacement data in relation to the first permissible operating range of the self-elevating vessel, and
    indicate it is safe to lower the self-elevating vessel from the first hull draft level to a second, deeper, hull draft level as a second stage in the coming off location operation of the self-elevating vessel when the first positional displacement data separate from the structural utilization ratio of the self elevating vessel indicates that the positional displacement of the self-elevating vessel while at the first hull draft level is within the first permissible operating range.

\* \* \* \* \*